(12) United States Patent
Retana et al.

(10) Patent No.: US 7,889,655 B2
(45) Date of Patent: Feb. 15, 2011

(54) TECHNIQUES FOR DETECTING LOOP-FREE PATHS THAT CROSS ROUTING INFORMATION BOUNDARIES

(75) Inventors: Alvaro Retana, Raleigh, NC (US); Russell White, Holly Springs, NC (US); Abhay Roy, Santa Clara, CA (US); Sina Mirtorabi, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 807 days.

(21) Appl. No.: 11/333,221

(22) Filed: Jan. 17, 2006

(65) Prior Publication Data

US 2007/0165532 A1 Jul. 19, 2007

(51) Int. Cl.
*G06F 11/07* (2006.01)
(52) U.S. Cl. ...................................... 370/235; 709/238
(58) Field of Classification Search ................ 370/225, 370/227, 228, 230–232, 235, 237–238, 241, 370/248–249, 242, 254–256, 351, 389–392, 370/400–401, 404–408, 474
See application file for complete search history.

(56) References Cited

U.S. PATENT DOCUMENTS

| 6,023,724 | A | 2/2000 | Bhatia et al. | |
|---|---|---|---|---|
| 6,046,985 | A * | 4/2000 | Aldred et al. | 370/252 |
| 6,314,105 | B1 * | 11/2001 | Luong | 370/395.2 |
| 6,473,431 | B1 | 10/2002 | Perlman et al. | |
| 6,519,231 | B1 * | 2/2003 | Ding et al. | 370/256 |
| 6,654,359 | B1 | 11/2003 | La Porta et al. | |
| 6,678,241 | B1 * | 1/2004 | Gai et al. | 370/216 |
| 6,690,653 | B1 * | 2/2004 | Anbiah et al. | 370/256 |

(Continued)

FOREIGN PATENT DOCUMENTS

WO   WO 2007/117727 A2   10/2007

(Continued)

OTHER PUBLICATIONS

J. Moy, Open Shortest Path First (OSPF) Version 2, Request for Comments, Apr. 1, 1998, p. 185, No. 2328, Publisher: Internet Engineering TaskForce, Published in: Internet (www.ietf.org).

(Continued)

*Primary Examiner*—Aung S Moe
*Assistant Examiner*—Curtis A Alia
(74) *Attorney, Agent, or Firm*—Patent Capital Group

(57) ABSTRACT

Techniques for detecting loops in routes that cross route information boundaries include receiving a control message at a first edge node on one side of the boundary that is connected to a different second edge node on another side of the boundary. The control message indicates a particular network address of a particular node that is reachable from the first edge node. Distinguisher data is determined that indicates if a node in the first collection can reach the first edge node without leaving the first collection. An advertising message is sent from the first edge node to the second edge node that includes route data that indicates the particular network address and the distinguisher data. Based on the distinguisher data, a testing edge node in the first collection can determine whether there is a loop comprising both an internal path and an external path to the first edge node.

24 Claims, 6 Drawing Sheets

U.S. PATENT DOCUMENTS

| | | | |
|---|---|---|---|
| 6,704,301 B2 | 3/2004 | Chari et al. | |
| 6,711,152 B1 | 3/2004 | Kalmanek et al. | |
| 6,721,290 B1 | 4/2004 | Kondylis et al. | |
| 6,721,344 B2 | 4/2004 | Nakao et al. | |
| 6,744,775 B1 | 6/2004 | Beshai et al. | |
| 6,820,134 B1 * | 11/2004 | Zinin et al. | 709/238 |
| 6,826,621 B1 | 11/2004 | Kephart et al. | |
| 6,865,151 B1 | 3/2005 | Saunders | |
| 6,961,310 B2 | 11/2005 | Cain | |
| 6,963,575 B1 * | 11/2005 | Sistanizadeh et al. | 370/404 |
| 7,002,949 B2 | 2/2006 | Garcia-Luna-Aceves et al. | |
| 7,190,696 B1 | 3/2007 | Manur et al. | |
| 7,286,479 B2 * | 10/2007 | Bragg | 370/238 |
| 2001/0024443 A1 | 9/2001 | Alriksson et al. | |
| 2002/0075807 A1 | 6/2002 | Troxel et al. | |
| 2002/0101821 A1 | 8/2002 | Feldmann et al. | |
| 2002/0112060 A1 * | 8/2002 | Kato | 709/227 |
| 2003/0026268 A1 | 2/2003 | Navas | |
| 2003/0037168 A1 * | 2/2003 | Brabson et al. | 709/249 |
| 2003/0095554 A1 * | 5/2003 | Shimizu | 370/395.53 |
| 2003/0112799 A1 * | 6/2003 | Chandra et al. | 370/389 |
| 2003/0174653 A1 * | 9/2003 | Basu et al. | 370/238 |
| 2003/0218988 A1 | 11/2003 | Han et al. | |
| 2003/0223379 A1 * | 12/2003 | Yang et al. | 370/256 |
| 2004/0081154 A1 * | 4/2004 | Kouvelas | 370/392 |
| 2004/0085912 A1 * | 5/2004 | Xu et al. | 370/254 |
| 2004/0139179 A1 * | 7/2004 | Beyda | 709/221 |
| 2004/0162819 A1 | 8/2004 | Omae et al. | |
| 2004/0196843 A1 * | 10/2004 | Zinin | 370/389 |
| 2004/0208175 A1 * | 10/2004 | McCabe | 370/389 |
| 2005/0030921 A1 | 2/2005 | Yau | |
| 2005/0047353 A1 * | 3/2005 | Hares | 370/255 |
| 2005/0074019 A1 | 4/2005 | Handforth et al. | |
| 2005/0089015 A1 * | 4/2005 | Tsuge et al. | 370/351 |
| 2005/0220077 A1 * | 10/2005 | Vereecke et al. | 370/351 |
| 2005/0221752 A1 * | 10/2005 | Jamieson et al. | 455/1 |
| 2006/0140111 A1 | 6/2006 | Vasseur et al. | |
| 2006/0159082 A1 | 7/2006 | Cook et al. | |
| 2006/0159095 A1 | 7/2006 | Cook et al. | |
| 2006/0165009 A1 * | 7/2006 | Nguyen et al. | 370/252 |
| 2006/0198321 A1 * | 9/2006 | Nadeau et al. | 370/254 |
| 2007/0019593 A1 | 1/2007 | Sarkar | |
| 2007/0053295 A1 | 3/2007 | Cleveland et al. | |
| 2007/0091795 A1 * | 4/2007 | Bonaventure et al. | 370/228 |
| 2007/0214283 A1 | 9/2007 | Metke et al. | |
| 2008/0002640 A1 | 1/2008 | Westphal | |
| 2008/0056157 A1 | 3/2008 | Retana et al. | |
| 2008/0062947 A1 | 3/2008 | Retana et al. | |
| 2008/0130500 A1 | 6/2008 | Retana et al. | |
| 2010/0008231 A1 | 1/2010 | Retana et al. | |

FOREIGN PATENT DOCUMENTS

| | | |
|---|---|---|
| WO | WO 2008/027668 A1 | 3/2008 |
| WO | WO 2008/033618 | 3/2008 |
| WO | WO 2008/067041 | 6/2008 |

OTHER PUBLICATIONS

"NovaRoam: Dynamic Routing for Mobile Networks," 2000, 29 pages, novaroam.com/downloads/wp_tora.pdf, Nova Engineering, Inc., Cincinnati, Ohio, USA.

C. Small, "Radio Shortest Path First (RSPF) Specification, IV, Link state propagation," 2000, 9 pages, rspf.sourceforge.net/rspfspec4.html, Internet.

Park and Corson, "Temporally-Ordered Routing Algorithm (TORA) Version 1 Functional Specification," Jul. 20, 2001, 22 pages, ietf.org.draft-ietf-manet-tora-spec-04-IETF, Internet-Draft.

Kennicott and Fisk, "Dynamic Allocation of Nodes on a Large Space-shared Cluster," 2001, 23 pages, cacr.caltech.edu/cluster2001/program/talks/kennicott.pdf, CalTech, Pasadena, CA, US.

Kaya et al., "SQS: An Experimental Scalable Network Structure for Efficient Querying of Micro Sensors," 2003, 12 pages, cse.yeditepe.edu.tr/tnl/wisent/htmls/pubs/pubs/sqs.pdf, Istanbl.

Karp and Kung, "GPSR: Greedy Perimeter Stateless Routing for Wireless Networks," 2000, 12 pages, eecs.harvard.edu/networking/papers/karp-kung-gpsr-500.pdf, Harvard, Cambridge, MA, US.

Curran, "SWARM: Cooperative Reinforcement Learning for Routing in Ad-hoc Networks," 2003, 84 pages, cs.tcd.ie/publications/tech-reports/reports.03/TCD-CS-2003-6.pdf, Trinity Col, Dublin.

Corson, Park, IMPETT, "Temporally-Ordered Routing Algorithm," 2006, 2 pages, www.isr.umd.edu/ISR/accomplishments/037_Routing, University of Maryland, Inst. Systems Res., Baltimore, MD, US.

International Search Report for International Application No. PCT/US07/60289 mailed Apr. 18, 2008 (3 pages).

International Preliminary Report on Patentability issued Jul. 22, 2008 (1 page) and Written Opinion mailed Apr. 18, 2008 (5 pages) for International Application No. PCT/US07/60289.

International Preliminary Report on Patentability issued Mar. 3, 2009 (1page) Written Opinion mailed Feb. 4, 2008 (6 pages) for International Application No. PCT/US07/073940.

International Search Report for International Application No. PCT/US07/073940 mailed Feb. 4, 2008 (1 page).

Notification of Transmittal of the International Search Report and the Written Opinion of the International Searching Authority, or the Declaration (1 page), International Search Report (2 pages), and Notification of Transmittal of the International Search Report and the Written Opinion of the International Searching Authority, or the Declaration (3 pages) for International Application No. PCT/US07/74890 mailed Jan. 30, 2008.

International Search Report for International Application No. PCT/US07/80857 mailed Mar. 21, 2008 (1 pape).

International Preliminary Report on Patentability issued Jun. 3, 2009 (1 page) and Written Opinion of the International Searching Authority mailed Mar. 21, 2008 (4 pages) for International Application No. PCT/US07/80857.

\* cited by examiner

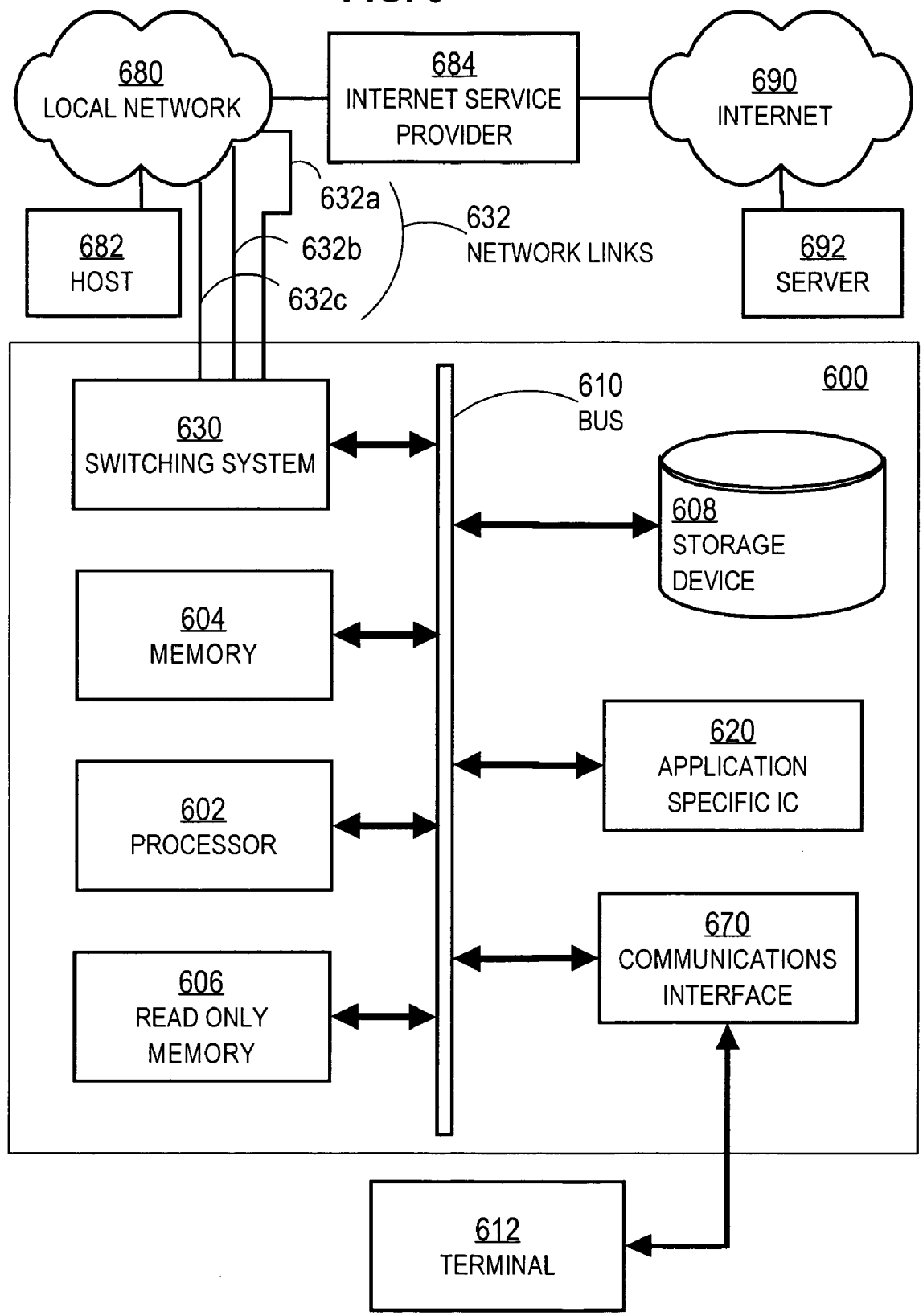

TECHNIQUES FOR DETECTING LOOP-FREE PATHS THAT CROSS ROUTING INFORMATION BOUNDARIES

BACKGROUND OF THE INVENTION

1. Field of the Invention

The present invention relates to building routing tables at intermediate network nodes for routes that cross boundaries of node groups that share routing information, such as routes that cross link-state flooding areas and autonomous systems; and in particular to techniques for passing routes at such boundaries that allow recipient nodes to determine whether a route available across the boundary causes a loop in which the next hop is further from the route destination node than is the recipient node.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The protocol in the payload is said to be encapsulated in the protocol of the header for the payload.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are network devices that determine which communication link or links to employ to support the progress of data packets through the network. A network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A link-state protocol is an example of a routing protocol, which only exchanges control plane messages used for routing data packets sent in a different routed protocol (e.g., IP). To reduce the consumption of network resources and improve scalability, some routing protocols divide a large network up into smaller subnetworks. For example, the Open System Interconnection (OSI) protocol suite and the Open Shortest Path First (OSPF) routing protocol divide a network into domains and areas. A domain is a portion of a network under the network administration of a single authority, such as an enterprise or Internet service provider (ISP). A domain is also called an autonomous system (AS). A domain is divided into areas. Each area is a group of contiguous subnetworks and attached end nodes specified by a network administrator, usually manually. In OSI, routers within an AS communicate with each other using an intermediate system to intermediate system (IS-IS) protocol. According to IS-IS, routing within an area (level 1 routing) uses link-state data that distinguishes each link on each router in the area. Routing between areas (level 2 routing) goes through a level 2 router that aggregates the addresses reachable through that level 2 router. By aggregating routing information for addresses reachable over many links of a level 2 router, the amount of network resources consumed to maintain link-state data and make routing decisions can be reduced and network scalability can be enhanced. The division of routers into areas is conventionally a manual process performed by human network administrators.

In an internetwork, networks in different autonomous systems (AS) also route data packets among each other. In general, the network nodes in an autonomous system are manually configured with an Autonomous System identifier (ASID).

Routing information for an AS is summarized at its boundaries with one or more other ASs at intermediate network nodes called border gateway nodes or border gateway (BG) routers. Routing information shared within the borders of one AS is exchanged using an interior gateway protocol (IGP). Example IGPs include the link state protocols OSPF and IS-IS described above. Another IGP, developed by Cisco Systems of San Jose, Calif. for use in its routers, is the Enhanced Interior Gateway Routing Protocol (EIGRP).

A level 3 routing protocol is used to exchange route summary and routing policy information across AS borders. For example, the Border Gateway Protocol (BGP) is a level 3 routing protocol. The BGP sends summary and policy information between adjacent boundary gateway nodes in different ASs using the External BGP (EBGP). The BGP sends summary and policy information between different boundary gateways in the same AS using the Internal BGP (IBGP).

When routes are advertised across boundaries, such as those between areas and autonomous systems, there is a chance for a route originally advertised by one area or autonomous system to be advertised back to that original area or autonomous zone. This can cause loops in which a first router passes traffic across a boundary to a second router farther from the destination than the first router. Both link state and BGP protocols have mechanisms in place to reduce or eliminate loops, so that certain advertised routes that cross such boundaries are ignored if they cause loops. However, these mechanisms may fail in certain cases.

For example, in situations involving many mobile routers that can join and depart a network, routers formerly in the same area or autonomous system may find there is no remaining interior (intra-boundary) route to a particular destination. In some such cases, route information that would ordinarily be rejected by existing mechanisms as causing loops do not in fact cause a loop and could be usefully retained.

For link state protocols there is a requirement that areas not be multiply-connected and that there be no more than two hierarchical levels of connects, such as a hub and spoke arrangement. This combined with a rule for one way passing of routing information prevents loops among areas of an autonomous system.

Based on the foregoing, there is a clear need for techniques to detect and prevent loops in paths that cross routing information boundaries, which do not suffer the problems of prior art approaches. In particular, there is a need for preserving cross boundary, loop-free routes when routers within a boundary are split into separate groups without intra-boundary paths. Also for link-state flooding areas, there is a need for preserving cross area, loop-free routes when areas are not arranged in a hub a spoke.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is a block diagram that illustrates a router upon which an embodiment of the invention may be implemented.

DETAILED DESCRIPTION

Techniques are described for detecting loops in routes that cross route information boundaries in a packet-switched communications network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments of the invention are described in the context of two types of groupings for routing information: groupings of link-state flooding areas using IS-IS and groupings of multiple autonomous systems using BGP. However, the invention is not limited to these contexts and protocols, but may be applied in any protocol that involves groupings in which summary routing information is exchanged between groups of intermediate network nodes in a packet-switched communications network. For example, OSPF may be used in groupings defined by areas within domains.

1.0 Network Overview

Figure 1:
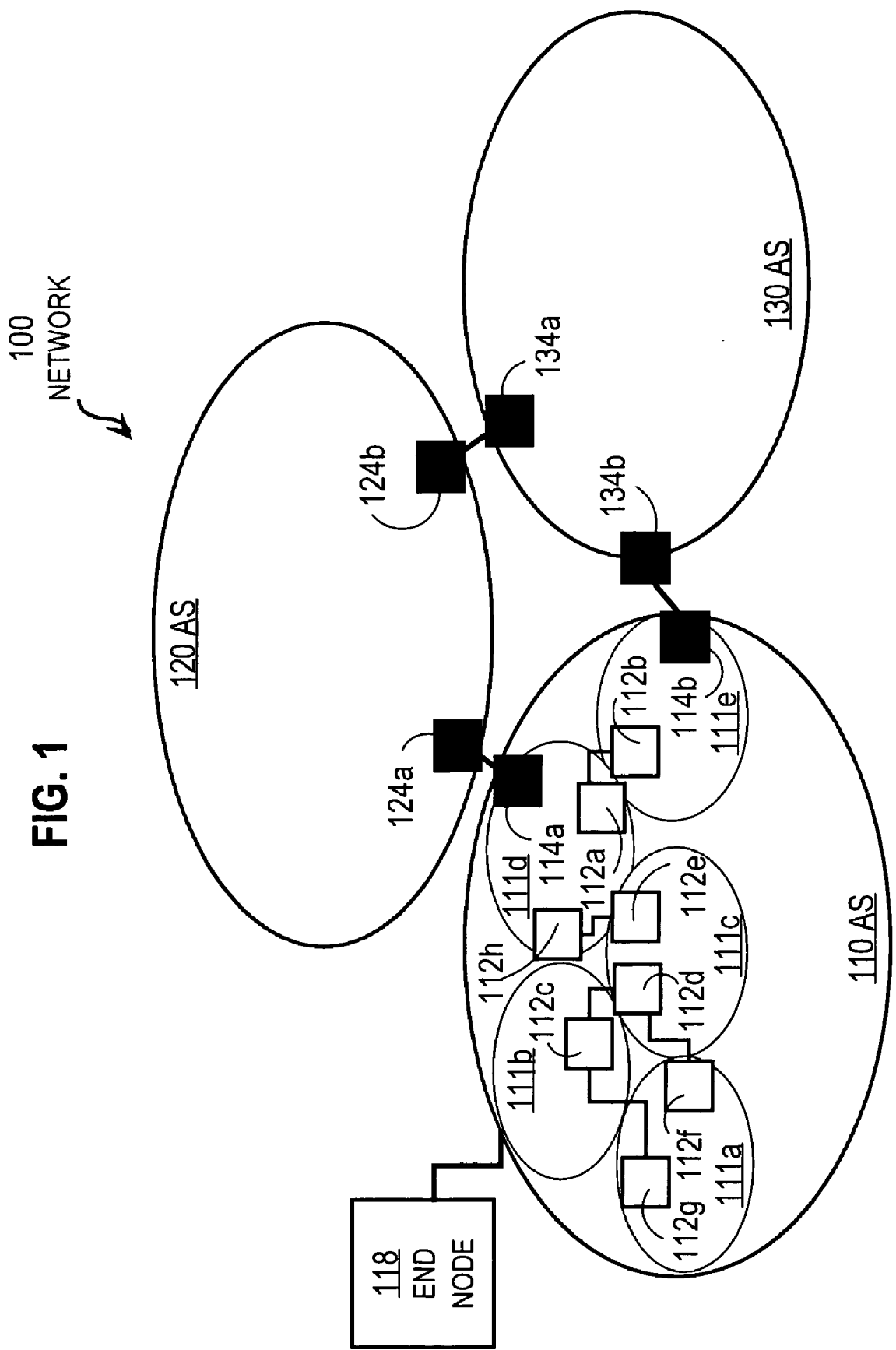
FIG. 1 is a block diagram that illustrates a network that includes multiple autonomous systems and multiple link-state flooding areas within an autonomous system, according to an embodiment.

FIG. 1 is a block diagram that illustrates a network 100 that includes multiple autonomous systems and multiple link-state flooding areas within an autonomous system, according to an embodiment. Network 100 includes autonomous areas AS 110, AS 120, AS 130. Each autonomous area includes multiple intermediate network nodes, such as routers, and end nodes. As depicted in FIG. 1, AS 110 includes end node 118 and routers 112a, 112b, 112c, 112d, 112e, 112f, 112g, 112h that are internal to AS 110 (collectively referenced hereinafter as internal AS routers 112). AS 110 also includes routers 114a, 114b on the border with AS 120 and AS 130, respectively. Similarly, AS 120 includes routers 124a, 124b on the borders with AS 110 and AS 130, respectively. Similarly, AS 130 includes routers 134a, 134b on the borders with AS 120 and AS 110, respectively. Routers 114a, 114b, 124a, 124b, 134a, 134b are collectively referenced hereinafter as border gateway (BG) routers. To easily distinguish the internal routers from the border gateway routers visually, in FIG. 1 the border gateway routers are solid filled. Both border gateway routers and internal AS routers 112 are intermediate network nodes.

As depicted in FIG. 1, AS 110 communicates with AS 120 through a communication link between BG routers 114a, 124a. Similarly, AS 110 communicates with AS 130 through a communication link between BG routers 114b, 134b. AS 110 and AS 130 communicate with each other through a communication link between BG routers 124b, 134a.

FIG. 1 also depicts multiple link-state flooding areas FA 111a, FA 111b, FA 111c, FA 111d, FA 111e (collectively referenced hereinafter as FA 111). Each flooding area includes multiple routers that share all routing information during updates. Routing information is passed between different flooding information as summary data through routers that server as aggregation points. In the illustrated embodiment, the depicted internal AS routers 112 are the aggregation routers for the depicted FA 111. As depicted in FIG. 1, summary routing information is passed between pairs of FA 111 through the communication links between pairs of routers 112a and 112b, 112c and 112d, 112d and 112f, 112e and 112h, 112g and 112c, respectively. In some embodiments, one aggregation router with two or more links is replaced by two or more aggregation routers with one links for example, in some embodiments, aggregation router 112c with two links is replaced by one aggregation router with one link to aggregation router 112d and a different aggregation router with one link to aggregation router 112g.

Each of the routers 112, 114 depicted in FIG. 1 is at a boundary of a collection of routers that share routing information. Routers 112 are at the boundaries of flooding areas. A flooding area is a collection of routers that share all their link-state information. Routers 114 are at the borders of autonomous systems. Autonomous systems share routing information using an intra-gateway protocol (IGP) such as IS-IS or OSPF.

Although certain autonomous systems AS 110, flooding areas FA 111, intermediate network nodes 112, 114, and end node 118 are depicted in FIG. 1 for purposes of illustration, network 100 includes more autonomous areas, flooding areas, intermediate network nodes, and end nodes. In other embodiments, a network includes more or fewer autonomous areas, flooding areas, intermediate network nodes, and end nodes.

As used here a route is a path to an end node indicated by a network address, such as an Internet Protocol (IP) address. A routing table is a data structure stored at a particular router that indicates the end node address and a link at that particular router used to reach that address. The routes are often learned by data traffic received at one router and then shared in control plane packets sent among other routers in the same flooding area. In some protocols the routing table data structure associates with the route one or more attribute fields that hold data that indicate certain properties of the route. For example, some attribute fields hold metric data that indicates a cost of using the route, such as a travel time, number of hops from the router to the address, or a measure of reliability, or some combination.

For example, in the illustrated embodiment, a router in FA 111b receives a data packet from end node 118 on a particular communications link, thus indicating to that router a route to the IP address of end node 118 on that link. This information and any metric data is then flooded to all the other routers in FA 111b, including aggregation router 112c. The information is summarized at router 112c and sent as summary information in an advertisement sent from router 112c to router 112d in different FA 111c, according to the IGP used in AS 110. This information is eventually passed to and stored at border gateway 114a. The information is then summarized again for level 3 routing and sent to another border gateway (e.g., 114b) of the same AS, e.g., using the Internal Border Gateway Protocol (IBGP). The border summarized information is sent to a border gateway (e.g., 124a) of a different AS, e.g., using the External Border Gateway Protocol (EBGP).

Without a loop-prevention mechanism in the IGP and BGP protocols, it is possible that a particular router is informed of two different paths to the same IP address and selects a path to retain in its routing table that sends the data packet to a router farther from the destination than the particular router itself. This is undesirable and can lead to a data packet taking a long path to a destination, or worse, to the data packet being sent back and forth between two intermediate routers, each thinking the best path is back to the router that sent the data packet.

For example, the route to end node 118 is advertised from router 112c in FA 111b to router 112d in FA 111c. Router 112d then advertises the route to router 112f in FA 111a, which shares the information with router 112g in the same flooding area, FA 111a. Router 112g then advertises the route back to router 112c in FA 111b. Now the routers in area 111b have a new route to end node 118. The direct route and the route through router 112g in FA 111a. However any router in FA 111b that send a data packet to router 112g in FA 111a is sending the packet to a router farther from the end node 118 than the sending router. When one of multiple routes to a destination takes a hop farther from the destination, a loop has been created. As is well known in the art, such loops can seriously degrade the performance of a network.

To avoid looping the IGPs and BGPs enforce loop prevention mechanisms that vary among the protocols, as described in more detail in following sections. For example, in most protocols, the advertisements are one-way. That is, a route is not advertised to a router that is on the link associated with the route in the routing table, according to the split horizon rule.

Furthermore, in IS-IS and OSPF, the flooding areas are limited to one or two levels of a hierarchy with only one path among any two different flooding areas. Thus connections in a two level hierarchy with three or more flooding areas have communication links only with a backbone flooding area, and not to each other. Routing information transmitted from the backbone area into an outlying area is never retransmitted back into the backbone area. Using such mechanisms, loops are prevented in network 100 by dropping one of the three communications links depicted among FA 111a, 111b, 111c.

In BGP, one or more attributes are sent with each route, including an AS_PATH attribute that indicates the ASID of the BG node that advertised the route. The ASID is used to avoid loops when ther are multiple connections between autonomous systems. Thus, a route for end node 118 advertised by router 114a in AS 110 to 124a in AS 120 is associated with the ASID of AS 110. When this route is advertised by router 124b in AS 120 to router 134a of AS 130, the route is associated with both ASID of AS 110 and also ASID of AS 120. When this route is advertised by router 134b of AS 130 back to router 114b of AS 110, the route is associated with ASID of AS 110, ASID of AS 120, and ASID of AS 130. The router 114b detects the route to end node 118 received from router 134b is already associated with AS 110 by virtue of the ASID for AS 110 in the AS_PATH attribute of the route to end node 118. Thus, router 114b rejects the route for end node 118 through router 134b as causing a loop.

2.0 Data Structures at Routing Information Boundary

Figure 2A:
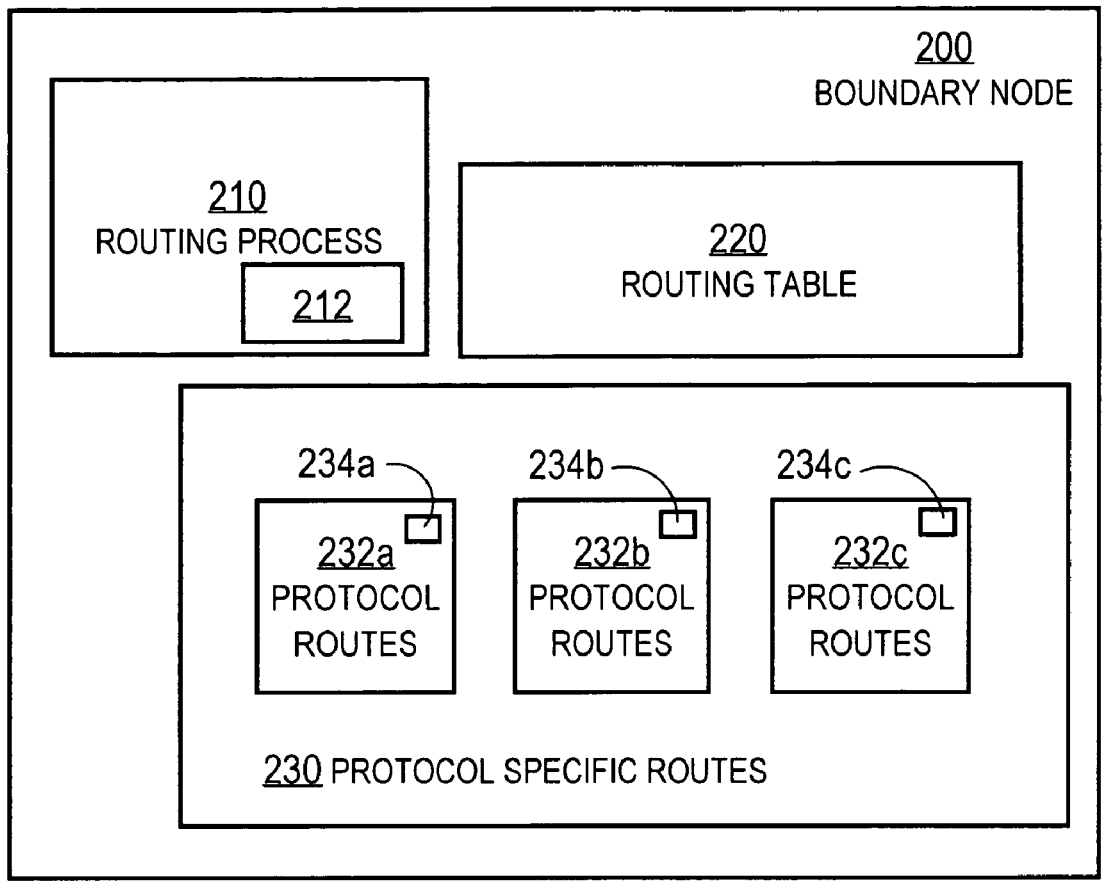
FIG. 2A is a block diagram that illustrates an boundary node that uses multiple routing protocols in a routing process, according to an embodiment.

FIG. 2A is a block diagram that illustrates a boundary node 200, such as a router, that uses a routing process and multiple routing protocols for intra-boundary control plane messages and for cross-boundary (inter-boundary) control plane messages, according to an embodiment. For example, in some embodiments, the boundary node 200 is an aggregation router for level 2 link-state information passed by an IGP such as IS-IS or OSPF or EIGRP. In some embodiments, the boundary node 200 is a border gateway node for level 3 routing and routing policy information passed by a BGP.

In the illustrated embodiment, the boundary node 200 includes a routing process 210, a routing table 220, and a protocol-specific routes data structure 230. The routing process is a process executing on a processor in boundary node 200 that receives, sends and processes routing information according to one or more protocols. For example, on a router within a flooding domain, process 210 executes level 1 link-state information flooding with adjacent routers according to IS-IS. On a router at an aggregation point (e.g., aggregation routers 112) the process 210 performs level 2 routing by summarizing routing information and preparing control plane messages with summary routing information to send to adjacent aggregation points for other flooding areas, and by processing summary information received from adjacent aggregation points, all according to IS-IS. On a router at a border gateway (e.g., BG routers 114), the process 210 processes level 3 routing information by preparing, sending and receiving BGP messages, either IBGP messages for other BG routers (e.g., BG router 114*b*) in the same autonomous system, or EBGP messages for BG routers (e.g., BG router 124*a*) in a different autonomous system.

The routing table 220 is a data structure that stores route information, i.e., a network address and a link on router 200 to use to communicate with that network address. In some embodiments, one or more route attributes are also stored in the routing table 220.

The protocol-specific route data structure 230 is a data structure that stores route information as received according to particular protocols. For purposes of illustration, three portions 232*a*, 232*b*, 232*c* (collectively referenced hereinafter as portions 232) of data structure 230 are shown for holding routing information received from three different protocols. For example, in a BG router 114, route information received from an IGP, such as IS-IS, OSPF or EIGRP is stored in one portion (e.g., portion 232*a*), IBGP route information is stored in another portion (e.g., portion 232*b*), and EBGP route information is stored in another portion (e.g., portion 232*c*). The routing process 210 stores routing information received in control messages according to each protocol in portions 232 and builds routing table 220 and data in one or more other portions 232 based on that information. In other embodiments, more or fewer portions 232 are included. For example, in some embodiments, the protocol-specific route data structure is omitted and all the routing information is in routing table 220. Link state protocols store one table for each area to which they are attached. Summaries of information, and information transmitted from one area into another, are carried between these databases through the border router processing.

According to various embodiments of the invention, one or more portions 232 of protocol specific routes data structure 230, or routing table 220, includes a field for storing distinguisher data associated with a route. In the illustrated embodiment, the portions 232*a*, 232*b*, 232*c* include distinguisher fields 234*a*, 234*b*, 234*c*, respectively, for storing distinguisher data. In some embodiments, one or more distinguisher fields are included in routing table 220. According to these embodiments of the invention, processor 210 is modified to include a process 212 that uses distinguisher data in protocol-specific routes 230 or routing table 220 to process, send or receive control plane messages that include distinguisher data.

Figure 2B:
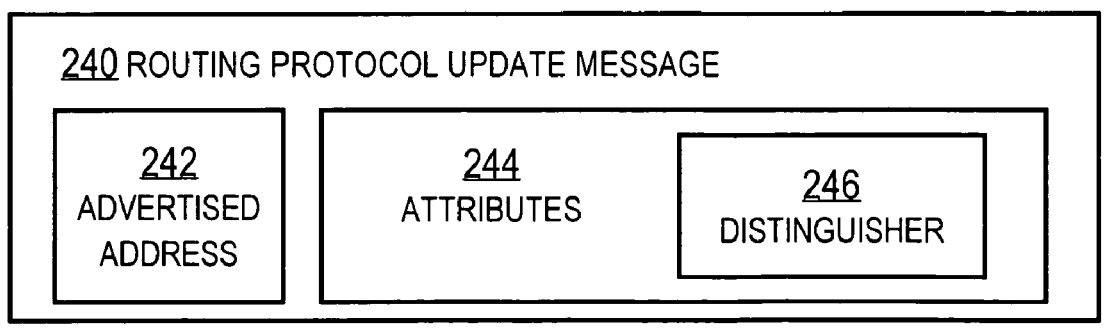
FIG. 2B is a block diagram that illustrates a control plane message for a routing protocol, according to an embodiment.

FIG. 2B is a block diagram that illustrates a control plane message 240 for a routing protocol, according to an embodiment. Control plane message 240 includes an advertised address field 242 and an attributes field 244. The advertised address field 242 includes data that indicates a network address of a node that identifies the route and is used as a source or destination of data packets to be routed. The attributes field 244 includes data that indicates one or more attributes of the route, such a metric in an IS-IS message or an AS_PATH in a BGP message. According to the illustrated embodiments of the invention, the attributes field 244 includes a distinguisher field 246 that includes distinguisher data. A recipient router of routing protocol update message 240 can determine based on the distinguisher data in field 246 whether there is a preferable internal path to the node with the advertised address in field 242. A preferable internal route eliminates at least one crossing of a boundary of the same level as the routing protocol update message. Thus if the routing protocol update message carries level 2 routing information, then a preferable internal route eliminates at least one crossing of a level two boundary between flooding areas. Similarly, if the routing protocol update message carries level 3 routing information, then a preferable internal route eliminates at least one crossing of a level three boundary between autonomous systems.

Data structures may be formed in any method known in the art, including using portions of volatile memory, or non-volatile storage on one or more nodes, in one or more files or in one or more databases accessed through a database server, or some combination. Although data structures 220, 230 are shown as integral blocks with contiguous portions 232 for purposes of illustration, in other embodiments one or more portions of portions 232 and data structures 220, 230 are stored as separate data structures on the same or different multiple nodes that perform the functions of boundary node 200.

The emerging wide use of mobile routers challenges the conventional mechanisms for preventing loops. With routers entering and departing flooding areas and autonomous systems, it becomes difficult or counter-productive to enforce flooding area connection restrictions. Two many routers entering the same flooding area may diminish the scaling advantage of the flooding area. Splitting the overcrowded area, manually or automatically, may violate the loop-prevention connection restrictions. Furthermore, a departing router or departing multiple routers in an autonomous area may break connections so that two routers with the same ASID may not be connected within the autonomous system. In such a circumstance, rejecting a more circuitous path through adjacent autonomous systems as a loop may leave the router with no path to a particular address. These various challenges, among others, are handled using various embodiments of the present invention.

According to various embodiments of the invention, a distinguisher field holding distinguisher data is included among attributes sent in a control plane message across a routing information boundary. This distinguisher data is used by a routing process at a boundary node to determine whether a loop is introduced by a route advertised in a control plane message of a routing protocol. The distinguisher data indicates information that can be used to determine whether a router that receives a particular route can reach the advertising router that advertised the route across a particular boundary without crossing that boundary. Stated another way, a recipient router of a routing protocol update message for routing information of a particular level with distinguisher data can determine based on the distinguisher whether there is a preferred internal route with the same destination as the advertised route. A preferred internal route eliminates at least one crossing of a boundary of the same level as the routing protocol update message.

3.0 Method at Routing Information Boundary

Figure 3A:
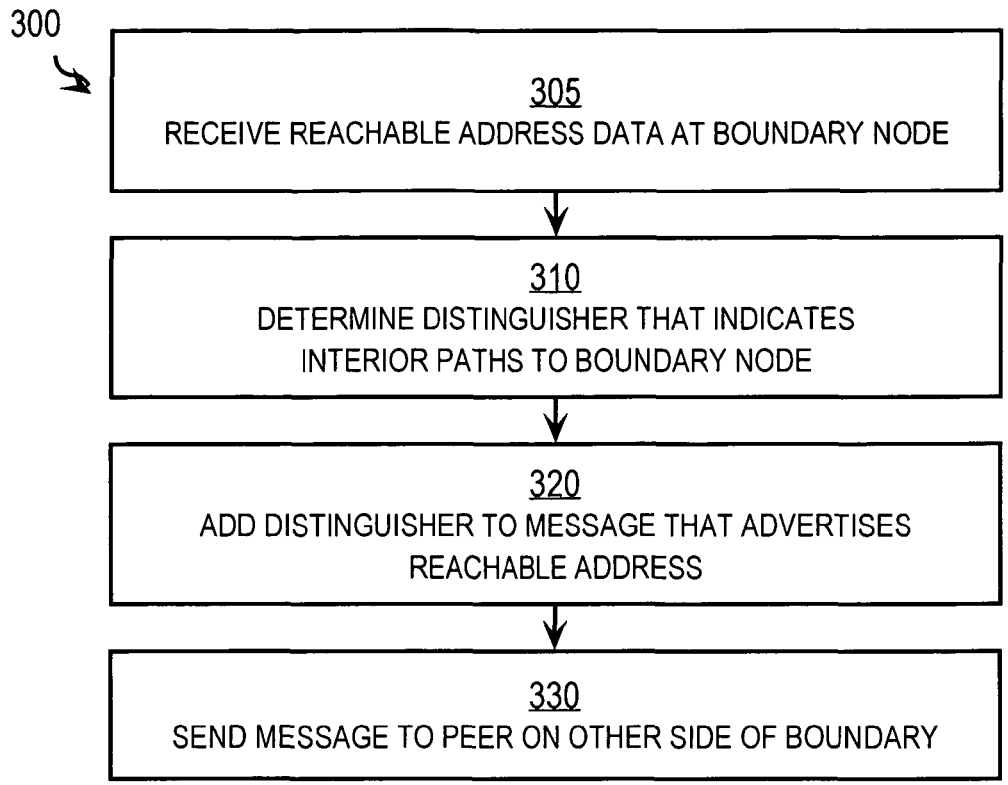
FIG. 3A is a flow diagram that illustrate at a high level a method for generating routing protocol messages for preventing loops in cross boundary routes, according to an embodiment.

FIG. 3A is a flow diagram that illustrate at a high level a method 300 for generating routing protocol messages for preventing loops in cross boundary routes, according to an embodiment. Although steps are shown in FIG. 3A and subsequent flow diagrams in a particular order for purposes of illustration, in other embodiments one or more steps are performed in a different order or overlapping in time, or one or more steps are omitted, or steps are changed in some combination of ways. For example, the order of steps 305 and 310 are swapped in some embodiments. In some embodiments, control passes back to step 305 after step 330; but step 310 is not repeated on the second and subsequent passes through the method.

In step 305 a boundary node on the boundary of a group of intermediate network nodes that share routing information at a particular level, e.g., boundary node 200, receives route data that indicates one or more network addresses reachable via hops inside the boundary.

In step 310 a distinguisher is determined for the boundary node. The distinguisher data indicates information used to determine whether there is an interior path to the boundary node from another node. An interior path is a series of hops between adjacent intermediate network nodes in the group that does not cross a boundary of the particular level to a different group.

In step 320, the distinguisher data is added to a routing protocol update message that advertises routes using routing information at the level of the boundary. For example, the distinguisher data is added as field 246 in attributes field 244 of message 240 depicted in FIG. 2B. In step 330, the message is sent to a peer boundary node on the boundary of a different group of intermediate network nodes that share routing information at the particular level.

The sent distinguisher data is used at the peer boundary node to determine whether there is a loop involved in using the boundary node to reach one of the network addresses advertised by the boundary node, as described in more detail below with reference to FIG. 3B.

Figure 3B:
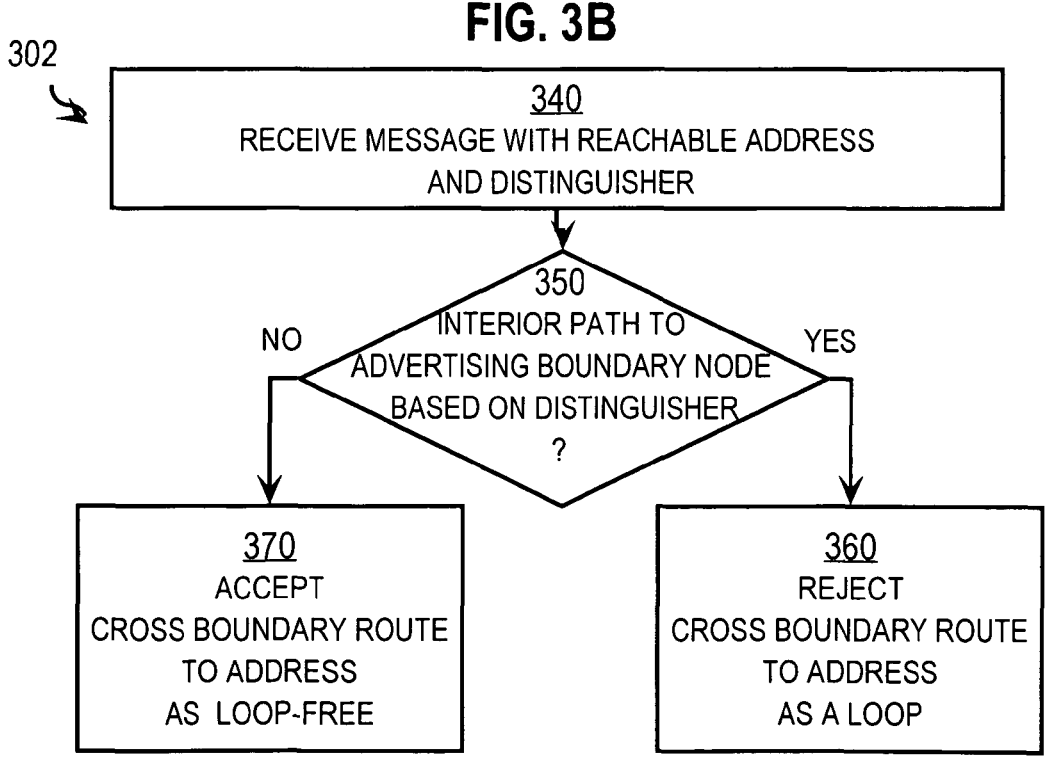
FIG. 3B is a flow diagram that illustrate at a high level a method for processing received routing protocol messages for preventing loops in cross boundary routes, according to an embodiment.

FIG. 3B is a flow diagram that illustrates at a high level a method 302 for processing received routing protocol messages for preventing loops in cross boundary routes, according to an embodiment.

In step 340, a routing protocol update message (e.g., message 240) is received at a boundary node, e.g., boundary node 200, on the boundary of a group of intermediate network nodes that share routing information at a particular level. The update message includes the distinguisher data, e.g., the distinguisher data is included as field 246 in attributes field 244 of message 240 depicted in FIG. 2B.

In step 350, it is determined whether the advertising boundary node can be reached with an internal path entirely within the local boundary based on the distinguisher data. The distinguisher data is defined for each protocol in order to make such a determination possible, as explained in the next sub-sections in more detail for the IGP and BGP protocols.

If the advertising boundary node can be reached with an internal path, control passes to step 360 to reject the advertised route across the boundary as a loop. If the advertised address can not be reached in an internal route within the boundary, control passes to step 370 to accept the advertised route across the boundary as loop-free.

Examples of the above method for level 2 routing information and level 3 routing information are described in the following sub-sections.

3.1 Method at Flooding Area Boundary

According to a conventional approach, as mentioned above, looping is avoided in level 2 boundaries between level 1 flooding areas by restricting connections between flooding areas. The flooding areas are limited to a single level or three or more flooding areas are connected through a backbone flooding area in a two-level hierarchy.

Every router within a flooding area shares the same database of reachable destinations and topology information. Each router's routing process calculates the shortest path to each reachable destination using a common algorithm (e.g., Dijkstra's shortest path first, SPF, algorithm). Only summarized reachability information is transmitted as level 2 routing information between two different flooding areas.

For example, with reference to FIG. 1, the routers in FA 111b pass all their connections to each other, including aggregation point boundary nodes, e.g., aggregation router 112c. Aggregation router 112c receives this information and uses it to build a tree of reachable intermediate nodes, and adds leaves to the intermediate nodes to represent reachable end nodes, such as end node 118. When aggregation router 112c advertises summary routing information to router 112d in FA 111c, however, it will not advertise intermediate node within FA 111b or flood the connections information. Instead, aggregation router 112c summarizes the routing information, advertising end node 118 as directly reachable through itself, router 112c, with a metric indicating the cost from router 112c to end node 118. As an aggregation point itself, router 112d summarizes the routing information it received from router 112c, advertising to nodes interior to FA 111c that end node 118 is directly reachable through router 112d. If there are no other connections back to FA 111b from 111c, then no loops are formed.

If, however, things are depicted as in FIG. 1, then a loop forms. As before aggregation router 112c summarizes the routing information, advertising end node 118 as directly reachable through itself, router 112c, with a metric indicating the cost from router 112c to end node 118. As before router 112d summarizes the routing information it received from router 112c, advertising to nodes interior to FA 111c that end node 118 is directly reachable through router 112d. Router 112d also advertises to router 112f in FA 111a that end node 118 is directly reachable through router 112d. Router 112f summarizes the routing information it received from router 112d, advertising to nodes interior to FA 111a, including aggregation router 112g that end node 118 is directly reachable through router 112f. Router 112g summarizes the routing information it received from router 112f, advertising back to aggregation router 112c in FA 111b that end node 118 is directly reachable through router 112g.

Router 112c now has two paths to end node 118, one through 112g and its original path within FA 111b. Usually, the original path within FA 111b has the lowest metric and is always chosen as the shortest path. However, in some circumstances the metric is reset and the metric associated with the path through 112g is lower, causing router 112c to select a path through 112g to end node 118, causing a loop. Metrics are always reset when a route is redistributed between two routing protocols, or when a metric is pulled to create an aggregate or summary route (such as between areas in an OSPF network). A route from the area in which 112c is located could pass out of the area, and then back into the area, with a new metric assigned either when it was advertised outside the area or from outside the area back inside the area.

Even if the metric is not reset, a transient loop also occurs when the link between end node 118 and one or more routers interior to FA 111b breaks. In this case, the internal router, not shown, removes the route to end node 118, leaving router 112c only with the path through router 112g. The path through 112g has a higher metric than the internal path for route 112c, so router 112c will update its summary of the metric to router 112d. The new summary metric is greater than the metric router 112d associates with the path through 112c in its routing table, so router 112d updates its routing table and sends an update message with the new higher metric to the routers internal to FA 111c and to router 112f in FA 111a. Router 112f in turn updates the metric to router 112g, which then updates a new increased metric to 112c and the update cycle begins again. The cycle repeats until the metric of the route to end node 118 reaches the maximum metric available in the routing protocol.

To avoid such looping, current implementations of link-state protocols used as IGPs restrict the network design to avoid multi-connected flooding areas. For example, link-state protocols require that flooding areas be on a single level or with one path through all flooding areas, or be arranged as spokes of a single hub flooding area. As stated above, this restriction is an impediment in networks with mobile routers that often enter and depart a network. According to an embodiment illustrated in this section, loping is avoided even when flooding areas are not arranged in a single level or as hub and spoke.

Figure 4A:
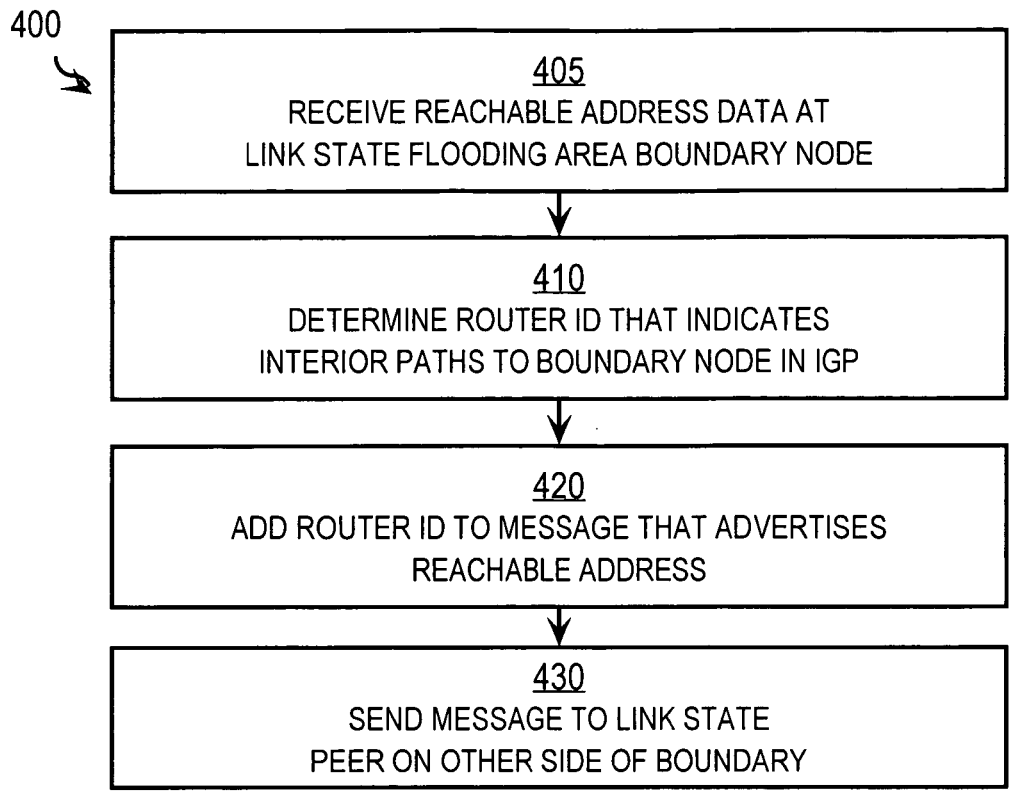
FIGS. 4A and 4B are flow diagrams that illustrate particular embodiments of the methods of FIG. 3A and FIG. 3B, respectively, for link-state aggregation routers, according to an embodiment.

FIG. 4A is a flow diagram that illustrate a particular embodiment method 400 of the method 300 for link-state flooding areas, according to an embodiment. Method 400 includes steps 405, 410, 420, 430. In step 405, reachable address data is received at a link-state flooding area boundary node. For example, the IP address of end node 118 is received at aggregation router 112c via one or more routers internal to FA 111b.

In step 410 a router identifier (router ID) is determined as the distinguisher to indicate interior paths to the boundary node. For example, each router that is serving as an aggregation point to summarize routing information along a border of two flooding areas is assigned a summarizer identifier that is unique throughout the network. For example, this is a 32-bit number, such as a locally configured IP address, or a unique name obtained from a name server for the network.

In step 420, the router ID is added to a protocol update message that advertises routes (i.e., network addresses reachable through the flooding area aggregation router). For example, the router ID for aggregation router 112c is added to distinguisher field 244 of a link-state update message in which the advertised address field 242 hold data that indicates the IP address of end node 118.

In step 430, the protocol update message is sent to a link-state aggregation point peer on the other side of the boundary. For example, the message 240 is sent to aggregation router 112d.

According to method 400, any router that summarizes routing information from one flooding domain into another flooding domain adds its router ID to the list of router IDs in the distinguisher field 246, before injecting the update message to the routers internal to the flooding domain. For example, aggregation router 112d adds its router ID to the field 246 before sending the update message to the other routers in FA 111c and aggregation router 112f in FA 111a. Table 1 gives the contents of the distinguisher field 246 sent across each boundary in the example of the looping discussed above. It is assumed for purposes of illustration that the router IDs of aggregation routers 112a through 112h are designated "R-A," "R-B," "R-C," "R-D," "R-E," "R-F," "R-G," "R-H," respectively.

TABLE 1

Example contents of distinguisher field 246
for link-state protocol update message.

| Sending router | Receiving router | Distinguisher field |
| --- | --- | --- |
| Router 112c | Router 112d | R-C |
| Router 112d | Router 112f | R-C, R-D |
| Router 112f | Router 112g | R-C, R-D, R-F |
| Router 112g | Router 112c | R-C, R-D, R-F, R-G |

Figure 4B:
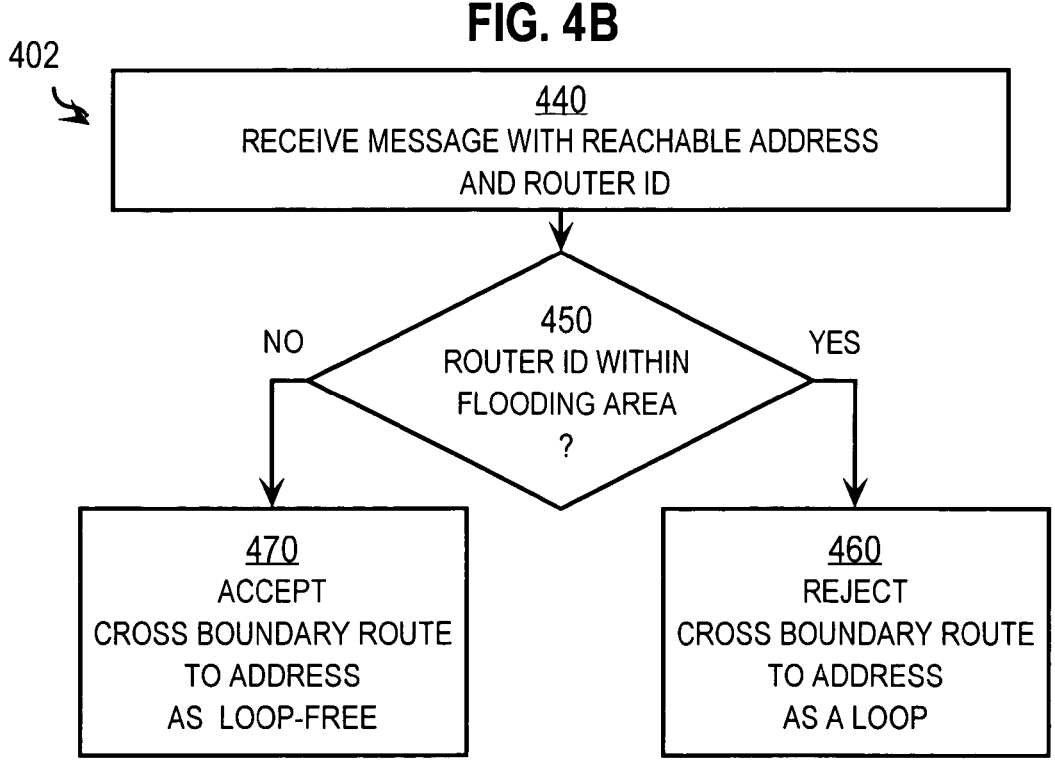

FIG. 4B is a flow diagram that illustrate a particular embodiment 402 of the method 302 for link-state flooding areas, according to an embodiment. Method 402 includes steps 440, 450, 460, 470.

In step 440, a link-state protocol level 2 summary update message is received at a aggregation router with the reachable address for the route and one or more router IDs in the distinguisher field. For example, router 112c receives a link-state summary update message from router 112g for the IP address of end node 118 and the router IDs indicated in the last row of Table 1 in the distinguisher field 246.

In step 450 it is determined whether the router ID is within the flooding area of the receiving boundary node. If so, control passes to step 460 to reject the cross boundary route to the reachable address as a loop. If not, control passes to step 470 to accept the cross boundary route to the reachable address as loop free.

For example, router 112c determines that it has router ID "R-C" that appears in the distinguisher field and therefore it can reach itself within its own flooding area, FA 111b. Essentially, the appearance of R-C in the distinguisher field indicates that the route advertised in the update message is simply the route already flooded within FA 111b that router 112c itself advertised to an adjacent flooding area. Control then passes to step 460 to reject the route to end point 118 advertised by aggregation router 112g.

For purposes of further illustration, it is assumed that router 112g has a link to a aggregation router (not shown) in FA 111b, which is different from router 112c. Then the different aggregation router receives the link-state summary update message from router 112g for the IP address of end node 118 and the router IDs indicated in the last row of Table 1 in the distinguisher field 246. Even in this embodiment, it is determined by the different aggregation router during step 450 that router 112c with router ID "R-C" is already on a link-state flooding routing table for the different router and is thus within the same flooding area.

For example, each aggregation router in a flooding area maintains protocol specific routes data structure 230 with portion 232a for the flooding area and with router IDs in distinguisher fields 234a associated with each route (e.g., each reachable address). Thus the different router finds the router ID "R-C" in field 234a for at least one route in the flooding area. The aggregation router also includes portion 232b for routes to destinations outside the flooding area. Routing table 220 is constructed from both sets of routes. In some embodiments, the routes to nodes outside the flooding area in the portion 232b include distinguisher fields 234b to hold router IDs for one or more aggregation routers that passed these routes. In some embodiments, the router IDs of the summarized routes are not used and field 234b are omitted. In embodiments in which the router ID is an IP address of the router for control plane packets, the router ID is listed in an adjacency table of routers adjacent to other routers in the flooding area and new, separate distinguisher fields are not needed on boundary node 200.

Thus, at the different router in FA 111b, also, it is determined in step 450 that router with ID "R-C" is within the flooding area, and again control passes to step 460 to reject the cross boundary route as a loop.

As a further example, consider router 112f, where a link-state summary update message is received during step 440 from router 112d for the IP address of end node 118 and the router IDs indicated in the second row of Table 1 in the distinguisher field 246. It is determined by aggregation router 112f during step 450 that router 112c with router ID "R-C" is not on the link-state routing table and is thus not within the same flooding area. Control passes to step 470 to accept the cross boundary route as loop-free.

Thus the routing loop described in the above example is not formed, both for cases in which a metric is reset and for cases in which a link to the end node 118 from within the flooding area is broken. Simultaneously, loop-free routes are promulgated throughout the autonomous system, e.g., AS 110.

This embodiment allows more general flooding areas to be formed within an autonomous system, including connecting flooding areas in hierarchies of any number of levels.

3.2 Method at Autonomous System Border

According to a conventional approach, looping is avoided at an autonomous system border by using an autonomous system identifier (ASID) for each autonomous system. Typically, this identifier is manually configured to be unique among the autonomous systems that make up a network, e.g., among AS 110, 120, 130 in network 100. It is anticipated that in some embodiments the ASIDs will be automatically configured using an ASID name server that guarantees the uniqueness of each ASID in a network. In the conventional approach, the ASIDs are accumulated in a route attribute called AS_PATH for each route as the route information is passed across AS borders.

Loops are prevented as shown in the following example. It is assumed for purposes of illustration that the ASIDs of AS 110, 120, 130 are 1, 2, 3, respectively. BG router 114a advertises a route for end node 118 to BG router 124a in a message that includes the ASID of 1 in the AS_PATH attribute. BG router 124b advertises a route for end node 118 to BG router 134a in a message that includes the ASIDs of 1 and 2 in the AS_PATH attribute (not necessarily in that order). BG router 134b advertises a route for end node 118 to BG router 114b in a message that includes the ASIDs of 1, 2 and 3 in the AS_PATH attribute (not necessarily in that order). BG router 114b, which has an ASID of 1, detects an ASID of 1 in the AS_PATH and rejects the route as a loop on its own route to end node 118.

This approach can fail, especially when mobile routers are involved. For example, in the illustrated network of 100 of FIG. 1, if the communication link between routers 112a and 112b is broken, BG router 114b no longer has an internal route to end node 118 within the AS 110. AS 110 is said to be partitioned, with FA 111e in one partition and the other flooding areas, FA 111a, FA 111b, FA 111c, FA 111d, in a second partition. Using the conventional approach, BG router 114b rejects the route for end node 118 through BG router 134b, as described above. Thus BG router 114b and all the routers in FA 111e are left without a route to end node 118 even though a route, albeit long, is available through AS 130 and AS 120.

Figure 5A:
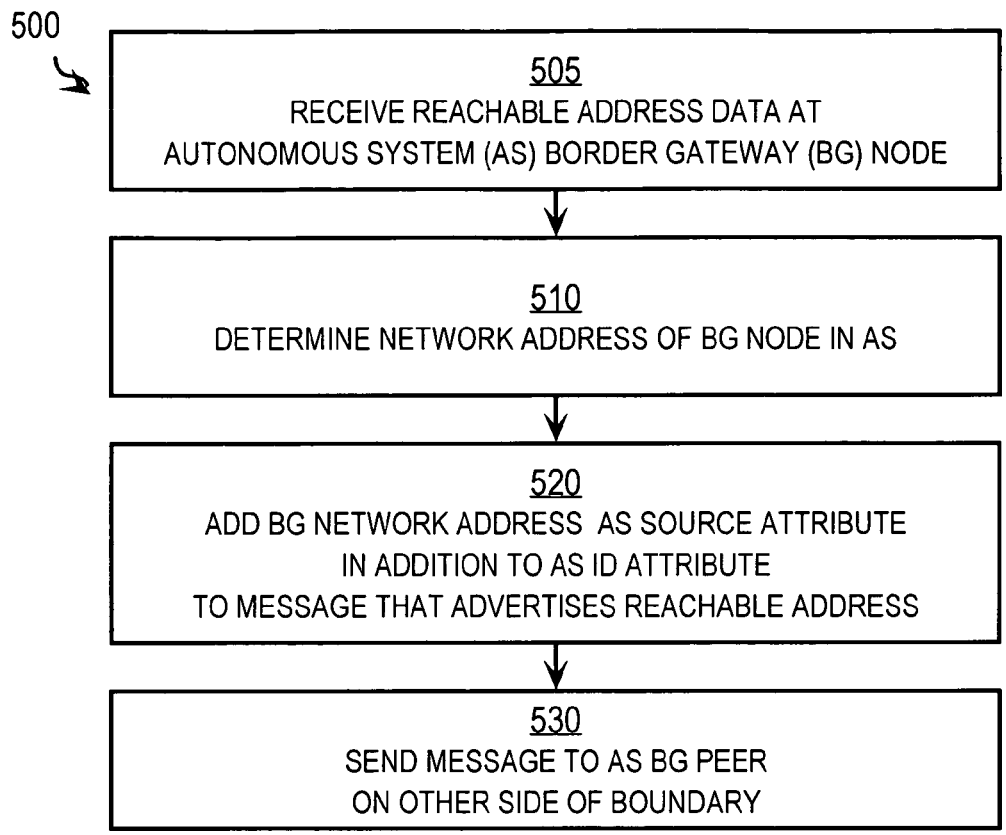
FIGS. 5A and 5B are flow diagrams that illustrate particular embodiments of the methods of FIG. 3A and FIG. 3B, respectively, for autonomous systems border gateway routers, according to an embodiment.

FIG. 5A is a flow diagram that illustrate a particular embodiment 500 of the method 300 for autonomous systems, according to an embodiment. Method 500 includes steps 505, 510, 520, 530 and remedies the failure noted in the above example. In step 505, reachable address data is received at an autonomous system border node. For example, the IP address of end node 118 is received at BG router 114a via one or more routers internal to AS 110 using an IGP such as IS-IS.

In step 510 an IP address on the BG router reachable within the autonomous system is determined as the distinguisher to indicate interior paths to the boundary node. For example, each router that is serving as a border gateway router has a loopback address that represents the border gateway router ID to other routers in the AS. In the illustrated embodiment the loopback address of the border gateway router (e.g., BG router 114a) is used as the distinguisher. In other embodiments, any address on the router that is reachable from within the autonomous system of the router is used. This route is in the local routing table not derived from a boundary crossing routing protocol, such as BGP in the case of BGP. This route is not an inter-area route (within the same flooding domain or area) for the OSPF and IS-IS cases.

In step 520, the BG router address is added to a protocol update message that advertises routes across the AS border, such as in EBGP messages but not in IBGP messages. For example, the address for BG router 114a is added to distinguisher field 244 of a BGP update message 240 in which the advertised address field 242 hold data that indicates the IP address of end node 118. In this case the distinguisher field is called a source attribute or an original address attribute, designated hereinafter as the ORIG_ADD attribute. Note that step 520 is not analogous to step 420. In step 520 the sending node does not add its identifier to the distinguisher field for intra-boundary update messages (e.g., IBGP) to other boundary nodes within the same boundary. The benefit of not inserting ASID and router addresses for IGBP updates is that the message takes fewer resources. However, this is not a restriction, and in some embodiments, the ASID and router address is also inserted into IBGP update messages.

In step 530, the EBGP update message is sent to a BG router peer on the other side of the border. For example, the EBGP update message 240 is sent to BG router 124a.

According to method 500, any BG router adds its router address to the list of router addresses in the ORIG_ADD distinguisher field 246, before sending the update message to a BG peer in a different autonomous system. For example, BG router 124b adds its router address to the field 246 before sending the update message to the BG peer, BG router 134a, in the next autonomous system, AS 130. Table 1 gives the contents of the distinguisher field 246 sent across each boundary in the example of the looping discussed above. It is assumed for purposes of illustration that the network addresses of BG routers 114a, 114b, 124a, 124b, 134a, 134b are 1.1.114.1, 1.1.114.2, 1.2.124.1, 1.2.124.2, 1.3.134.1, 1.3.134.2, respectively, and that the ASIDs for AS 110, 120, 130 are 1, 2, 3 respectively.

TABLE 2

Example contents of attributes field 244 for BGP update message.

| Sending router | Receiving router | AS_PATH | Distinguisher field |
|---|---|---|---|
| Router 114a | Router 124a | 1 | 1.1.114.1 |
| Router 124a | Router 124b | 1 | 1.1.114.1 |
| Router 124b | Router 134a | 1, 2 | 1.1.114.1, 1.2.124.2 |
| Router 134a | Router 134b | 1, 2 | 1.1.114.1, 1.2.124.2 |
| Router 134b | Router 114b | 1, 2, 3 | 1.1.114.1, 1.2.124.2, 1.3.134.2 |

Figure 5B:
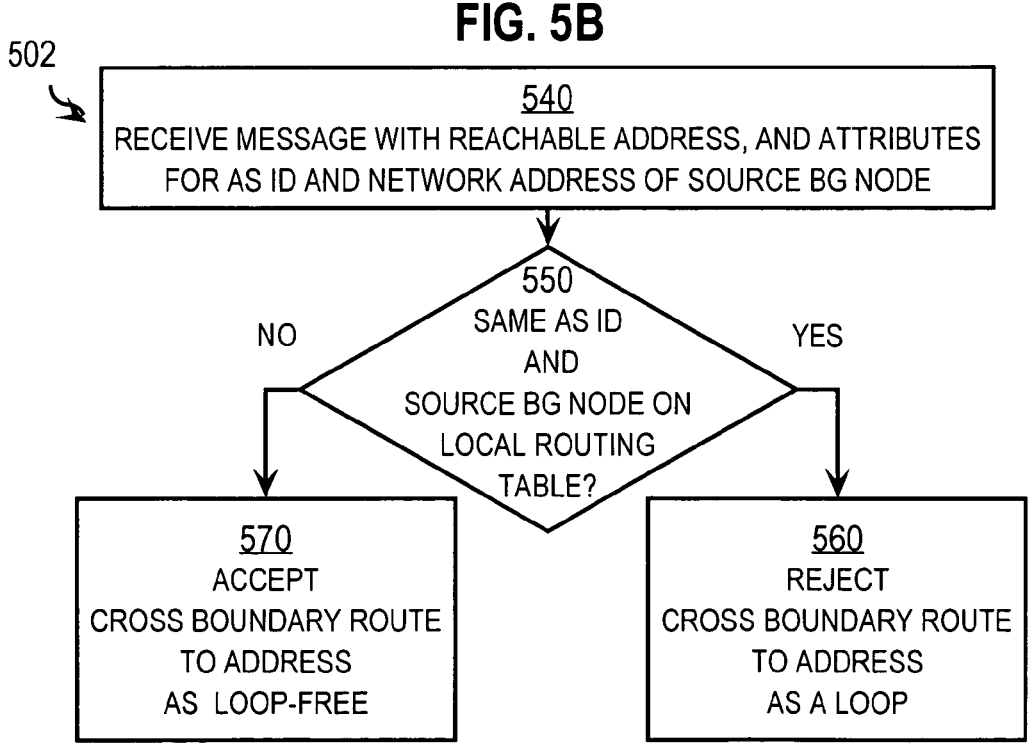

FIG. 5B is a flow diagram that illustrate a particular embodiment 502 of the method 302 of FIG. 3B for the BGP, according to an embodiment. Method 502 includes steps 540, 550, 560, 570.

In step 540, a routing protocol update message is received at a boundary node with the reachable address for the route and a source BG router address in the distinguisher field. For example, router 114b receives a BGP update message from router 134b for the IP address of end node 118 and the BG router addresses indicated in the last row of Table 1 in the distinguisher field 246.

In step 550 it is determined whether the source BG router is reachable within the autonomous system of the receiving BG router. If so, control passes to step 560 to reject the cross boundary route to the reachable address as a loop. If not, control passes to step 570 to accept the cross boundary route to the reachable address as loop free. In the illustrated embodiment, step 550 includes a step to determine if the ASID of the receiving BG router is in the AS_PATH, as in the conventional approach. If not, the route is accepted as loop-free, as in the conventional approach.

However, if the ASID of the receiving BG router is in the AS_PATH, then a further checking step is performed according to the illustrated embodiment. In the further checking step, it is determined whether the address of the source BG router associated with the ASID that matches the ASID of the receiving BG router is reachable from the receiving BG router. For example, the receiving BG router checks the addresses reachable through the IGP as listed in the IGP specific routes of the protocol specific routes data structure 230. For a BG router, the protocol specific routes data structure 230 includes protocol routes portion 232a for the IGP, portion 232b for IBGP routes, and portion 232c for EBGP routes. In this embodiment, the EBGP and IBGP routes, portion 232c, and portion 232b, respectively, include distinguisher fields 234c, 234b, respectively. Distinguishers are not used for the IGP routes and distinguisher field 234a is omitted.

In some embodiments, all addresses in the ORIG_ADD distinguisher field are checked, not just those associated with the same ASID as the ASID of the receiving BG router. Such an embodiment takes fewer instructions, but can be significantly slower to execute if there are many different autonomous systems in the AS_PATH.

In the illustrated network 100, router 114b determines that it has an ASID of 1 and finds an ASID of 1 in the AS_PATH. Therefore, during step 550, the router 114b determines the BG router address associated with ASID of 1, and finds the address 1.1.114.1. Essentially, the appearance of address 1.1.114.1 in the distinguisher field indicates that the route advertised in the update message to end node 118 is already available to router 114a in the same autonomous area as receiving BG router 114b. As long as BG router 114b has an internal path entirely within AS 110 to address 1.1.114.1, then BG router 114b and the other routers in its flooding area FA 111e can reach end node 118 an internal path and would reject as a loop the route to end node 118 through AS 130 advertised in the update just received in step 540.

To determine whether BG router 114b has an internal path entirely within AS 110 to address 1.1.114.1, the BG router 114b looks in the IGP routes in portion 232a of the protocol specific routes data structure 230. If the address 1.1.114.1 is included in that portion, then BG router 114b has an internal path entirely within AS 110 to address 1.1.114.1. If so, control then passes to step 560 to reject the route to end point 118 advertised by BG router 134b. If not, control then passes to step 570 to accept the route to end point 118 advertised by BG router 134b as loop-free.

Thus, if the connection between routers 112a and router 112b is broken, router 112b uses the IGP to update all routers in FA 111e. As a result, BG router 114b removes all addresses in the other partition from its IGP routes stored in portion 232c of the protocol specific routes data structure 230, including removing address 1.1.114.1 of BG router 114a. When a BGP update is received from BG router 134b with a route to end node 118, the BG router 114b will find ASID of 1 in the AS_PATH but not find an IGP route to address 1.1.114.1 during step 550. Control will pass to step 570 to accept the cross boundary route to end node 118 as loop-free.

4.0 Implementation Mechanisms

Hardware Overview

FIG. 6 is a block diagram that illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 610 for use by the processor from an external terminal 612, such as a terminal with a keyboard containing alphanumeric keys operated by a human user, or a sensor. A sensor detects conditions in its vicinity and transforms those detections into signals compatible with the signals used to represent information in computer system 600. Other external components of terminal 612 coupled to bus 610, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 612. In some embodiments, terminal 612 is omitted.

Computer system 600 also includes one or more instances of a communications interface 670 coupled to bus 610. Communication interface 670 provides a two-way communication coupling to a variety of external devices that operate with their own processors, such as printers, scanners, external disks, and terminal 612. Firmware or software running in the computer system 600 provides a terminal interface or character-based command interface so that external commands can be given to the computer system. For example, communication interface 670 may be a parallel port or a serial port such as an RS-232 or RS-422 interface, or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 600 includes switching system 630 as special purpose hardware for switching information for flow over a network. Switching system 630 typically includes multiple communications interfaces, such as communications interface 670, for coupling to multiple other devices. In general, each coupling is with a network link 632 that is connected to another device in or attached to a network, such as local network 680 in the illustrated embodiment, to which a variety of external devices with their own processors are connected. In some embodiments an input interface or an output interface or both are linked to each of one or more external network elements. Although three network links 632a, 632b, 632c are included in network links 632 in the illustrated embodiment, in other embodiments, more or fewer links are connected to switching system 630. Network links 632 typically provides information communication through one or more networks to other devices that use or process the information. For example, network link 632 b may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides routing information for use with switching system 630.

The switching system 630 includes logic and circuitry configured to perform switching functions associated with passing information among elements of network 680, including passing information received along one network link, e.g. 632a, as output on the same or different network link, e.g., 632c. The switching system 630 switches information traffic arriving on an input interface to an output interface according to pre-determined protocols and conventions that are well known. In some embodiments, switching system 630 includes its own processor and memory to perform some of the switching functions in software. In some embodiments, switching system 630 relies on processor 602, memory 604, ROM 606, storage 608, or some combination, to perform one or more switching functions in software. For example, switching system 630, in cooperation with processor 604 implementing a particular protocol, can determine a destination of a packet of data arriving on input interface on link 632 a and send it to the correct destination using output interface on link 632c. The destinations may include host 682, server 692, other terminal devices connected to local network 680 or Internet 690, or other routing and switching devices in local network 680 or Internet 690.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620 and circuits in switching system 630, may be used in place of or in combination with software to implement the invention.

Thus, embodiments of the invention are not limited to any specific combination of hardware and software.

The signals transmitted over network link 632 and other networks through communications interfaces such as interface 670, which carry information to and from computer system 600, are exemplary forms of carrier waves. Computer system 600 can send and receive information, including program code, through the networks 680, 690 among others, through network links 632 and communications interfaces such as interface 670. In an example using the Internet 690, a server 692 transmits program code for a particular application, requested by a message sent from computer 600, through Internet 690, ISP equipment 684, local network 680 and network link 632 b through communications interface in switching system 630. The received code may be executed by processor 602 or switching system 630 as it is received, or may be stored in storage device 608 or other non-volatile storage for later execution, or both. In this manner, computer system 600 may obtain application program code in the form of a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 632b. An infrared detector serving as communications interface in switching system 630 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602 or switching system 630.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
receiving a control plane message at a first edge node of a first collection of network nodes that are configured to share different routing information within the first collection of network nodes than is shared outside the first collection of network nodes, which first edge node is connected to a different second edge node of a different second collection of network nodes that are configured to share different routing information within the second collection of network nodes than is shared outside the second collection of network nodes,
wherein the control plane message includes data that indicates a particular network address of a particular node that is reachable from the first edge node;
determining distinguisher data that indicates information that can be used to determine if a node in the first collection of network nodes can reach the first edge node without leaving the first collection of network nodes; and
sending an advertising control message from the first edge node to the second edge node that includes route data that indicates the particular network address, and the distinguisher data, whereby a testing edge node in the first collection of network nodes can determine based on the distinguisher data whether there is a loop comprising both a first path between the testing edge node and the first edge node within the first collection of network nodes and also a second path between the testing edge node and the first edge node, wherein the second path includes nodes outside the first collection of network nodes, wherein if the loop is detected then the advertising control message is rejected and the route data is not incorporated into a routing table, wherein the distinguisher data is provided in fields of the control plane message, the advertising control message, and the routing table, and wherein the routing table includes entries for specific protocol distinguisher data for separate level two and level three routing determinations such that internal routes within a defined network boundary can be identified.

2. A method as recited in claim 1, wherein:
the first collection of network nodes and the second collection of network nodes are different link-state flooding areas that exchange summary link state information with a link state protocol;
a link-state flooding area shares routing information by flooding all routing information to other network nodes of the same link-state area; and
the distinguisher data indicates a unique router identifier for the first edge node.

3. A method as recited in claim 1, wherein:
the first collection of network nodes and the second collection of network nodes are different autonomous systems that exchange routing information using an external border protocol;
an autonomous system shares routing information with an internal gateway protocol (IGP); and
the distinguisher data indicates a network address of a network interface on the first edge node.

4. A method as recited in claim 3, wherein the distinguisher data is associated with an autonomous system identifier (ASID) of the first edge node in the advertising control message.

5. A method as recited in claim 3, wherein the external border protocol is an External Border Gateway Protocol (EBGP).

6. A method, comprising:
receiving a control plane message at a first edge node of a first collection of network nodes that are configured to share different routing information within the first collection of network nodes than is shared outside the first collection of network nodes, from a different second edge node of a different second collection of network nodes that are configured to share different routing information within the second collection than is shared outside the second collection,
wherein the control plane message includes route data that indicates a particular network address of a particular node, and distinguisher data that indicates a third edge node that advertises ability to reach the particular network address;

determining whether the first node can reach the third edge node without leaving the first collection of network nodes based on the distinguisher data; and if it determined that the first node can not reach the third edge node without leaving the first collection of network nodes, then determining that there is not a loop to the particular node, which loop comprises both a first path between the first edge node and the third edge node entirely within the first collection of network nodes and also a second path between the first edge node and the third edge node that includes nodes outside the first collection of network nodes, wherein if the loop is detected then an advertising control message is rejected and the route data is not incorporated into a routing table, wherein the distinguisher data is provided in fields of the control plane message, the advertising control message, and the routing table, and wherein the routing table includes entries for specific protocol distinguisher data for separate level two and level three routing determinations such that internal routes within a defined network boundary can be identified.

7. A method as recited in claim 6, wherein:
the first collection of network nodes and the second collection of network nodes are different link-state areas that exchange summary link state information with a link state protocol;
a link-state area floods all link-state data to other network nodes of the same link-state area;
the distinguisher data indicates a router identifier for the third edge node.

8. A method as recited in claim 6, wherein:
the first collection of network nodes and the second collection of network nodes are different autonomous systems that exchange routing information using an external border protocol;
an autonomous system shares routing information with an internal gateway protocol (IGP);
the distinguisher data indicates a network address of the third edge node.

9. A method as recited in claim 8, wherein the distinguisher data is associated with an autonomous system identifier (ASID) of the third edge node in the control plane message.

10. A method as recited in claim 8, wherein the external border protocol is an External Border Gateway Protocol (EBGP).

11. A method as recited in claim 8, wherein the distinguisher data indicates a network address of the advertising edge node.

12. An apparatus, comprising:
a first network interface of a first edge node that is coupled to a first network of nodes configured to share different routing information than is shared outside the first network for communicating therewith a first data packet;
a different second network interface that is coupled to a second network of nodes configured to share different routing information than is shared outside the second network for communicating therewith a second data packet;
one or more processors;
a non-transitory computer-readable medium; and
one or more sequences of instructions stored in the computer-readable medium, which, when executed by the one or more processors, causes the one or more processors to carry out the step of:
receiving a control plane message over the first network interface, wherein the control plane message includes data that indicates a particular network address of a particular node that is reachable through the first network interface;
determining distinguisher data that indicates information that can be used to determine if a node in the first network can reach the first network interface; and
sending through the second network interface an advertising control message that includes route data that indicates the particular network address, and the distinguisher data,
whereby a testing edge node in the first network can determine based on the distinguisher data whether there is a loop comprising both a first path between the testing edge node and the first network interface and also a second path between the testing edge node and the second network interface, wherein if the loop is detected then the advertising control message is rejected and the route data is not incorporated into a routing table, wherein the distinguisher data is provided in fields of the control plane message, the advertising control message, and the routing table, and wherein the routing table includes entries for specific protocol distinguisher data for separate level two and level three routing determinations such that internal routes within a defined network boundary can be identified.

13. An apparatus as recited in claim 12, wherein:
the first network of nodes and the second network of nodes are in different link-state flooding areas that exchange summary link state information with a link state protocol;
a link-state flooding area shares routing information by flooding all routing information to other network nodes of the same link-state area; and
the distinguisher data indicates a unique router identifier for the first edge node.

14. An apparatus as recited in claim 12, wherein:
the first network of nodes and the second network of nodes are in different autonomous systems that exchange routing information using an external border protocol;
an autonomous system shares routing information with an internal gateway protocol (IGP); and
the distinguisher data indicates a network address of a network interface on the first edge node.

15. An apparatus as recited in claim 14, wherein the distinguisher data is associated with an autonomous system identifier (ASID) of the first edge node in the advertising control message.

16. An apparatus as recited in claim 14, wherein the external border protocol is an External Border Gateway Protocol (EBGP).

17. An apparatus, comprising:
a first network interface of a first edge node that is coupled to a first network of nodes configured to share different routing information than is shared outside the first network of nodes for communicating therewith a first data packet;

a different second network interface that is coupled to a second network of nodes configured to share different routing information than is shared outside the second network of nodes for communicating therewith a second data packet;

one or more processors;

a non-transitory computer-readable medium; and one or more sequences of instructions stored in the computer-readable medium, which, when executed by the one or more processors, causes the one or more processors to carry out the step of:

receiving over the second network interface a control plane message that includes route data that indicates a particular network address of a particular node, and distinguisher data that indicates an advertising edge node that advertises ability to reach the particular network address;

determining whether the advertising edge node can be reached through the first network interface; and if it determined that the advertising edge node can not be reached through the first network interface, then determining that there is not a loop to the particular node, which loop comprises both a first path between the advertising edge node and the first network interface and also a second path between the advertising edge node and the second network interface, wherein if the loop is detected then an advertising control message is rejected and the route data is not incorporated into a routing table, wherein the distinguisher data is provided in fields of the control plane message, the advertising control message, and the routing table, and wherein the routing table includes entries for specific protocol distinguisher data for separate level two and level three routing determinations such that internal routes within a defined network boundary can be identified.

18. An apparatus as recited in claim 17, wherein:

the first network of nodes and the second network of nodes are in different link-state areas that exchange summary link state information with a link state protocol;

a link-state area floods all link-state data to other network nodes of the same link-state area;

the distinguisher data indicates a router identifier for the third edge node.

19. An apparatus as recited in claim 17, wherein:

the first network of nodes and the second network of nodes are in different autonomous systems that exchange routing information using an external border protocol;

an autonomous system shares routing information with an internal gateway protocol (IGP);

the distinguisher data indicates a network address of the third edge node.

20. An apparatus as recited in claim 19, wherein the distinguisher data is associated with an autonomous system identifier (ASID) of the third edge node in the control plane message.

21. An apparatus as recited in claim 19, wherein the external border protocol is an External Border Gateway Protocol (EBGP).

22. An apparatus as recited in claim 19, wherein the distinguisher data indicates a network address of the advertising edge node.

23. A non-transitory computer-readable medium carrying one or more sequences of instructions, wherein execution of the one or more sequences of instructions by one or more processors causes the one or more processors to perform the operations comprising:

receiving a control plane message at a first edge node of a first collection of network nodes that are configured to share different routing information within the first collection of network nodes than is shared outside the first collection of network nodes, which first edge node is connected to a different second edge node of a different second collection of network nodes that are configured to share different routing information within the second collection of network nodes than is shared outside the second collection of network nodes, wherein the control plane message includes data that indicates a particular network address of a particular node that is reachable from the first edge node;

determining distinguisher data that indicates information that can be used to determine if a node in the first collection of network nodes can reach the first edge node without leaving the first collection of network nodes; and sending an advertising control message from the first edge node to the second edge node that includes route data that indicates the particular network address; and the distinguisher data, whereby a testing edge node in the first collection of network nodes can determine based on the distinguisher data whether there is a loop comprising both a first path between the testing edge node and the first edge node entirely within the first collection of network nodes and also a second path between the testing edge node and the first edge node, which second path includes nodes outside the first collection of network nodes, wherein if the loop is detected then the advertising control message is rejected and the route data is not incorporated into a routing table, wherein the distinguisher data is provided in fields of the control plane message, the advertising control message, and the routing table, and wherein the routing table includes entries for specific protocol distinguisher data for separate level two and level three routing determinations such that internal routes within a defined network boundary can be identified.

24. A non-transitory computer-readable medium carrying one or more sequences of instructions, wherein execution of the one or more sequences of instructions by one or more processors causes the one or more processors to perform the operations comprising:

receiving a control plane message at a first edge node of a first collection of network nodes that are configured to share different routing information within the first collection of network nodes than is shared outside the first collection of network nodes, from a different second edge node of a different second collection of network nodes that are configured to share different routing information within the second collection of network nodes than is shared outside the second collection of network nodes, wherein the control plane message includes route data that indicates a particular network address of a particular node, and distinguisher data that indicates a third edge node that advertises ability to reach the particular network address; determining whether the first node can reach the third edge node without leaving the first collection of network nodes based on the distinguisher data; and if it determined that the first node can not reach the third edge node without leaving the first collection of network nodes, then determining that there is not a loop to the particular node, which loop comprises both a first path between the first edge node and the third edge node entirely within the first collection of network nodes and also a second path between the first edge node and the third edge node that includes nodes outside the first collection of network nodes, wherein if the loop is detected then an advertising control message is rejected and the route data is not incorporated into a routing table, wherein the distinguisher data is provided in fields of the control plane message, the advertising control message, and the routing table, and wherein the routing table includes entries for specific protocol distinguisher data for separate level two and level three routing determinations such that internal routes within a defined network boundary can be identified.

* * * * *